United States Patent [19]
Zott

[11] Patent Number: 5,927,869
[45] Date of Patent: Jul. 27, 1999

[54] STEP BEARING FOR A SHAFT OF A SPINNING ROTOR LOADED BY AN AXIAL FORCE

[75] Inventor: Werner Zott, Donzdorf, Germany

[73] Assignees: Hans Stahlecker, Bad Ueberkingen, Germany; Fritz Stahlecker, Suessen, Germany

[21] Appl. No.: 08/963,867

[22] Filed: Nov. 4, 1997

[30] Foreign Application Priority Data

Dec. 17, 1996 [DE] Germany .................. 196 52 507

[51] Int. Cl.$^6$ .................. F16C 19/12; D01H 7/12
[52] U.S. Cl. .................. 384/610; 57/406
[58] Field of Search .................. 384/610, 240, 384/243, 244, 245, 248, 249, 368, 371, 420, 606; 57/406

[56] References Cited

U.S. PATENT DOCUMENTS

| 4,105,265 | 8/1978 | Stahlecker | 57/406 X |
| 4,106,192 | 8/1978 | Stahlecker | 384/610 |
| 4,186,548 | 2/1980 | Stahlecker | 57/406 |
| 4,618,273 | 10/1986 | Götz et al. | 384/606 |
| 4,703,616 | 11/1987 | Fauchter et al. | 57/406 X |
| 4,916,891 | 4/1990 | Landwehrkamp et al. | 57/406 |
| 5,090,261 | 2/1992 | Nakatsukasa | 384/610 X |

*Primary Examiner*—Thomas R. Hannon
*Attorney, Agent, or Firm*—Evenson McKeown Edwards & Lenahan, PLLC

[57] ABSTRACT

A step bearing for a shaft of a spinning rotor includes a freely rotatable supporting ball and a thrust bearing, against which the supporting ball is disposed. The supporting ball, the thrust bearing and a front-sided supporting surface of the shaft are placed in a housing for lubricating grease. The housing is arranged in a cartridge, which, together with the supporting ball, can be disassembled. It is hereby possible to renew the supply of lubricating grease by simply exchanging the cartridge.

35 Claims, 1 Drawing Sheet

STEP BEARING FOR A SHAFT OF A SPINNING ROTOR LOADED BY AN AXIAL FORCE

BACKGROUND AND SUMMARY OF THE INVENTION

This application claims the priority of German application 196 52 507.1 filed in Germany on Dec. 17, 1996, the disclosure of which is expressly incorporated by reference herein.

The present invention relates to a step bearing for a shaft of a spinning rotor which shaft is loaded by an axial force, said step bearing comprising a freely rotatable supporting ball which is disposed against a thrust bearing, against which supporting ball the shaft is supported by a front-ended supporting surface, the supporting ball being housed in a housing for lubricating grease which is supplied to the supporting surface.

A step bearing of the above type is known from U.S. Pat. No. 4,618,273. In this case, the housing for the lubricating grease is a part of a larger housing, which comprises a collecting container for used lubricating grease. When the supply of lubricating grease is used up, a fresh supply of lubricating grease can be supplied to the housing by means of a correspondingly formed lubricating grease press. The housing is not disassembled for this purpose. In a variation of the known step bearing, the collecting container can be disassembled for cleaning.

Further lubrication of the known step bearing is complicated and requires special implements.

It is an object of the present invention to construct a step bearing of the above mentioned type which can be easily relubricated.

This object has been achieved in accordance with the present invention in that the housing is arranged in a cartridge, which can be disassembled together with the supporting ball.

It is thus possible to change a used cartridge for a cartridge with a fresh supply of lubricating grease. The work involved for re-lubricating the step bearing is reduced and therefore also the cost. The cartridge is not taken apart when disassembled, but rather the supporting ball disposed therein is disassembled with the cartridge.

In place of the disassembled cartridge, a cartridge with the required supply of lubricating grease and a supporting ball is installed. The cartridge to be installed can be a used cartridge which has been accordingly prepared, that is, cleaned and provided with a new supply of lubricating grease. The used cartridge can be taken apart during preparation. The supporting ball present in the used cartridge can, as a rule, be used again.

In an advantageous embodiment of the present invention, the cartridge with the supporting ball is constructed as a disposable part. It is often not worth preparing a used cartridge, particularly when it is made of plastic, for example, as it can be manufactured cost-effectively. The supporting ball thrown away with the cartridge can also be manufactured or procured cost-effectively.

In an advantageous embodiment of the present invention, the cartridge is releasably secured to a stationary holding device. It is practical to use fixing structure which is easily released, for example clip connections, plug connections or the like.

In a further embodiment of the present invention, the cartridge can be disassembled in the opposite direction to the axial force. The work involved for relubricating is hereby further reduced.

The thrust bearing can be arranged in the housing in such a way that it is securely connected to the cartridge, for example, the thrust bearing can be attached to the bottom of the cartridge. In this case, it is purposeful for the present invention when the cartridge is arranged in an axially adjustable manner. By adjusting the axial position of the cartridge, the thrust bearing connected thereto is also axially adjusted.

In another advantageous embodiment of the present invention, the thrust bearing is arranged on a supporting part which projects into the cartridge. It is in this case purposeful for the present invention when the thrust bearing is axially adjustable by means of an adjusting part, which is connected with the supporting part for the thrust bearing.

It can be provided that the supporting part and the adjusting part are components of the cartridge and are disassembled together with same. The cartridge can in such a case be directly releasably fixed to a stationary holding device in a constant position.

In a further advantageous embodiment, the supporting part for the thrust bearing is connected with the holding device, and the cartridge is releasable from the supporting part. The cartridge is released from the supporting part for disassembling, whereby the supporting part itself remains connected with the holding device and is not disassembled. Thus only the cartridge with the supporting ball is exchanged and replaced by a cartridge with a supporting ball. The cartridge serves thus only as a housing for the supporting ball to be taken up and for the lubricating grease to be replaced. The thrust bearing remains in its position during the exchange of the cartridge with the supporting ball and does not need to be re-adjusted. It is therefore possible to construct the cartridge with a large amount of tolerance. When the cartridge is being assembled, it need not be exactly positioned. By means of this embodiment it is thus possible to renew the supply of lubricating grease in a particularly simple and cost-effective way.

In the case of the above mentioned embodiment, it is possible to fix the cartridge to the holding device by using suitable fixing structure. It is, however, also possible to fix the cartridge to the supporting part for the thrust bearing and thus to fix the cartridge only indirectly to the holding device. It is hereby possible to use additional fixing structure connected to the holding device, or to use only the supporting part for the thrust bearing for fixing the cartridge.

In an advantageous embodiment of the present invention, the supporting ball is surrounded in circumferential direction of the shaft by webs arranged at short distances to the supporting ball, which webs project inwards from the peripheral wall of the cartridge. These webs serve as supporting surfaces for the supporting ball when the shaft is removed from the step bearing. The position of the supporting ball on the webs is such that the webs are pressed into their operational position by the shaft when it is re-inserted.

In an advantageous embodiment the housing is divided by the webs into sectioned parts for the lubricating grease to be housed therein, which sectioned parts are open in the direction towards the supporting ball. The supply of lubricating grease present in the housing can for the greater part be housed in the sectioned parts.

In an advantageous embodiment of the present invention, the cartridge comprises a collecting chamber for the lubricating grease exiting out of the housing, which collecting chamber adjoins the housing and through which collecting chamber the shaft projects into the housing.

BRIEF DESCRIPTION OF THE DRAWINGS

These and further objects, features and advantages of the present invention will become more readily apparent from the following detailed description thereof when taken in conjunction with the accompanying drawings wherein.

DETAILED DESCRIPTION OF THE DRAWINGS

Figure 1:
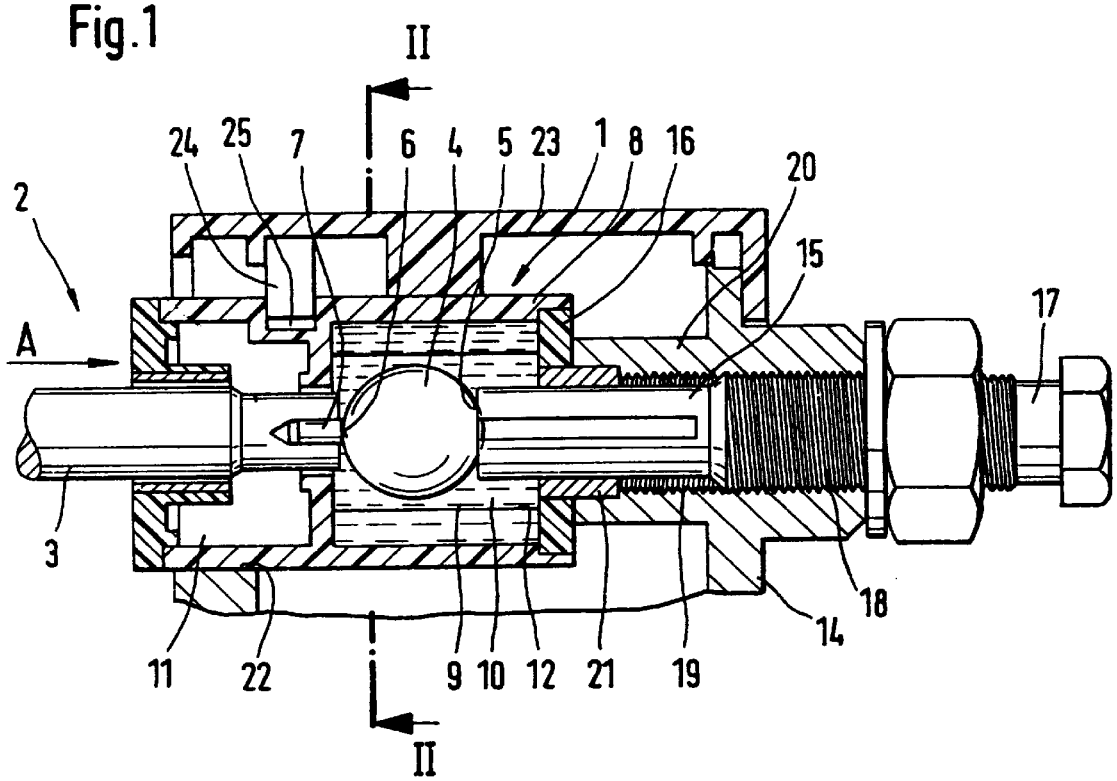
FIG. 1 is a longitudinal section of a step bearing for a spinning rotor with a cartridge comprising a housing for lubricating grease and a supporting ball, and constructed according to a preferred embodiment of the invention.

The step bearing 1 shown in FIG. 1 is a component of an open-end rotor spinning device (not shown), which comprises a spinning rotor 2 with a shaft 3 and a rotor cup (not shown). The shaft 3 is supported in a way not shown in a radial bearing, which takes the form of a so-called supporting disk bearing. A supporting disk bearing of this type consists in a known way of four supporting disks arranged in pairs, whereby each pair of these supporting disks forms a wedge-shaped gap in which the shaft 3 is disposed. By means of appropriate measures, in particular a slight slanting of the axes of the supporting disk pairs, an axial force is exerted in the direction of arrow A towards the end of the shaft 3.

The step bearing 1 serves to take up the axial forces of the horizontally arranged shaft 3, which step bearing 1 comprises a freely rotatable supporting ball 4 and a thrust bearing 5, which has a concave surface adapted to the supporting ball 4. In the operational position of the spinning rotor 2, the shaft 3 is supported with a front-ended supporting surface 6 on the supporting ball 4 and presses same into the concave receiver of the thrust bearing 5. The supporting surface 6 is formed by the front surface of a ceramic pin 7, which is housed in a centrical bore hole at the end of the shaft 3.

It has been shown that the grease lubrication is particularly effective when the supporting surface 6, as in the case of the embodiment of the present invention described here, is made of a ceramic material. Other materials, for example hardened steel, could also be used for the supporting surface.

The step bearing 1 is housed in a cartridge 8 which is made of plastic and which has a cylindrical form. The cartridge 8 is divided into two interior chambers, namely a housing 9 for lubricating grease 10, and a collecting chamber 11. The collecting chamber 11 is disposed directly adjacent to the housing 9 and serves to collect particles of lubricating grease 10 which exit from the housing 9.

The shaft 3 projects with its end through the collecting chamber 11, whereby the section comprising the front-ended supporting surface 6 projects into the housing 9. The collecting chamber 11 comprises two openings disposed opposite one another, through which the shaft 3 is inserted. The openings are sealed by means of sealing devices surrounding the shaft 3. Any parts of the lubricating grease 10, for example oil, which may be taken up by the end of the shaft 3 in the housing 9, are collected in the collecting chamber 11 and do not reach the outside.

Figure 2:
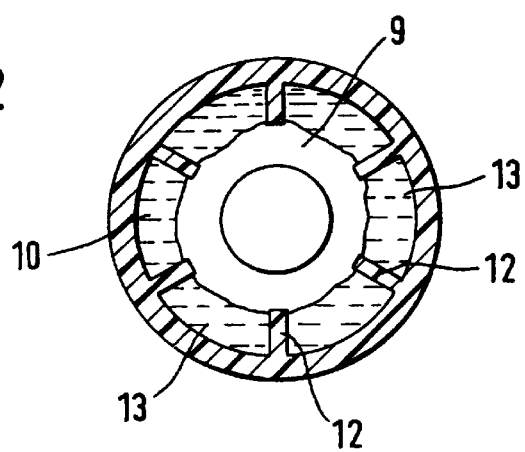
FIG. 2 is a cross section of the housing of the cartridge of FIG. 1 along the line II—II of FIG. 1, whereby the supporting ball is not shown.

As can be seen in particular from FIG. 2, the housing 9 comprises webs 12, which project radially inwards from the peripheral wall of the cartridge 8 and which surround the supporting ball 4 (see also FIG. 1) at a short distance therefrom. When the shaft 3 is withdrawn from the housing 9 in the opposite direction to the arrow A, the supporting ball 4 falls out of the concave receiver of the thrust bearing 5 and is disposed on the vertically arranged webs 12 below. The housing 9 is divided by the webs 12 into sectioned parts 13 (see also FIG. 2), which surround the supporting ball 4 and which are filled with a supply of lubricating grease 10.

The cartridge 8 is releasably fixed to a stationary holding device 14 (see also FIG. 1), which is connected with a frame of the open-end rotor spinning device in a way not shown. The thrust bearing 5 is arranged with a supporting part 15 in the form of a pin, which projects a short way into the housing 9 through a bottom 16 of the cartridge 8. The supporting part 15 is connected with an adjusting part 17, which takes the form of a threaded screw having an outer thread 18, whereby the pin-shaped supporting part 15 forms the end part of this threaded screw. The adjusting part 17 is screwed with its outer thread 18 into an inner thread 19 of the holding device 14. The inner thread 19 is arranged in a hollow cylindrical projection 20 of the holding device 14, which projection 20 extends in the direction towards the cartridge 8. When the adjusting part 17 is turned, the pin-shaped supporting part 15 is axially displaced. In this way the axial position of the thrust bearing 5 and thus also the supporting ball 4 can be adjusted.

In the area of its front end facing the cartridge 8, the hollow cylindrical projection 20 takes up a section of a bearing bush 21 made of sintered metal, whereby the other section of the bearing bush 21 projects out of the hollow cylindrical projection 20. The bearing bush 21 is pressed into the hollow cylindrical projection 20 and surrounds the pin-shaped supporting part 15 in such a way that it is guided during axial displacement.

The flexibly formable bottom 16 of the cartridge 8 is provided with a cylindrical opening, whose diameter is slightly smaller than the outer diameter of the bearing bush 21. The bottom 16 of the cartridge 8 is slid on a little way onto the bearing bush 21, whereby a relatively secure but releasable close sliding fit between the bottom 16 and the bearing bush 21 arises. When the adjusting part 17 is turned, the axial position of the pin-shaped supporting part 15 is altered and that of the thrust bearing 5 supported thereon, independent of the position of the cartridge 8.

In the area below the shaft 3, the holding device 14 forms a shell 22, on which the cylindrical cartridge 8 is disposed. The position of the cartridge 8 is set also by a lid 23, which is fixed to the holding device 14, said lid comprising a pivot 24, which projects into a recess 25 of the cartridge 8.

When the supply of lubricating grease 10 is used up, the cartridge 8 is exchanged for a new one. For this, the lid 23 is first removed, so that the pivot 24 comes out of the recess 25 of the cartridge 8. The cartridge 8, together with the supporting ball 4, can now be pulled out, that is, in the opposite direction to the arrow direction A. The bottom 16 is released from its close sliding fit with the bearing bush 21. The supporting part 15 with the thrust bearing 5 remains unaltered in its adjusted POSition.

After the cartridge 8 has been disassembled, another cartridge, comprising a supporting ball and the required supply of lubricating grease, is assembled. This takes place in reverse order to the disassembling of the cartridge 8. The bottom of the new cartridge is slid onto the bearing bush 21, whereby an exact positioning of the cartridge 8 is not necessary. After the cartridge 8 has been exchanged, the axial position of the thrust bearing 5 is unchanged, whereby the newly assembled supporting ball attains an exact position which corresponds to the position of the disassembled supporting ball 4.

After the cartridge 8 has been slid onto the bearing bush 21, the lid 23 is fixed to the holding device 14, whereby the pivot 24 is disposed in a corresponding recess of the new cartridge.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A step bearing for a shaft of a spinning rotor, which shaft is loaded with an axial force and comprises a front-ended supporting surface, supported by a freely rotatable supporting ball disposed against a thrust bearing of said step bearing, said supporting ball being housed in a housing containing lubricating grease for supplying the supporting surface, wherein the housing is arranged in a cartridge, which can be disassembled as a unit together with the supporting ball, and wherein the cartridge can be disassembled in a direction opposite the direction of the axial force.

2. A step bearing according to claim 1, wherein the cartridge together with the supporting ball is designed as a disposable component.

3. A step bearing according to claim 1, wherein the cartridge is releasably fixed to a stationary holding device.

4. A step bearing according to claim 2, wherein the cartridge is releasably fixed to a stationary holding device.

5. A step bearing according to claim 1, wherein the thrust bearing is arranged with a supporting part which projects into the cartridge.

6. A step bearing according to claim 5, wherein the thrust bearing is axially adjustable by means of an adjusting part which is connected with the supporting part for the thrust bearing.

7. A step bearing according to claim 6, wherein the supporting part is connected with the holding device and wherein the cartridge is releasable from the supporting part.

8. A step bearing according to claim 1, wherein the cartridge comprises a collecting chamber for the lubricating grease exiting from the housing, said collecting chamber being disposed adjacent to the housing and through which collecting chamber the shaft projects into the housing.

9. A step bearing according to claim 1, wherein the cartridge is made of plastic.

10. A step bearing for a shaft of a spinning rotor, which shaft is loaded with an axial force and comprises a front-ended supporting surface, supported by a freely rotatable supporting ball disposed against a thrust bearing of said step bearing, said supporting ball being housed in a housing containing lubricating grease for supplying the supporting surface, wherein the housing is arranged in a cartridge, which can be disassembled as a unit together with the supporting ball, and wherein the supporting ball is surrounded, in the peripheral direction of the shaft, by webs arranged at short distances therefrom, the said webs projecting inwards from the peripheral wall of the cartridge.

11. A step bearing according to claim 10, wherein the housing is divided by the webs into sectioned parts for housing the lubricating grease, which sectioned parts are open in the direction of the supporting ball.

12. A step bearing according to claim 10, wherein the cartridge can be disassembled in a direction opposite the direction of the axial force.

13. A step bearing according to claim 12, wherein the thrust bearing is arranged with a supporting part which projects into the cartridge.

14. A step bearing according to claim 13, wherein the thrust bearing is axially adjustable by means of an adjusting part which is connected with the supporting part for the thrust bearing.

15. A step bearing according to claim 14, wherein the supporting part is connected with the holding device and wherein the cartridge is releasable from the supporting part.

16. A step bearing according to claim 15, wherein the supporting ball is surrounded, in the peripheral direction of the shaft, by webs arranged at short distances therefrom, the said webs projecting inwards from the peripheral wall of the cartridge.

17. A step bearing according to claim 16, wherein the housing is divided by the webs into sectioned parts for housing the lubricating grease, which sectioned parts are open in the direction of the supporting ball.

18. A step bearing according to claim 17, wherein the cartridge comprises a collecting chamber for the lubricating grease exiting from the housing, which collecting chamber is disposed adjacent to the housing and through which collecting chamber the shaft projects into the housing.

19. A step bearing according to claim 18, wherein the cartridge is made of plastic.

20. A step bearing according to claim 10, wherein the cartridge comprises a collecting chamber for the lubricating grease exiting from the housing, said collecting chamber being disposed adjacent to the housing and through which collecting chamber the shaft projects into the housing.

21. A bearing cartridge according to claim 20, wherein the housing is arranged in a cartridge, which can be disassembled as a unit together with the supporting ball, and wherein the supporting ball is surrounded, in the peripheral direction of the shaft, by webs arranged at short distances therefrom, the said webs projecting inwards from the peripheral wall of the cartridge.

22. A bearing cartridge according to claim 21, wherein the housing is divided by the webs into sectioned parts for housing the lubricating grease, which sectioned parts are open in the direction of the supporting ball.

23. A bearing cartridge according to claim 21, wherein the cartridge is made of plastic.

24. A bearing cartridge according to claim 21, wherein the cartridge comprises a collecting chamber for the lubricating grease exiting from the housing, said collecting chamber being disposed adjacent to the housing and through which collecting chamber the shaft projects into the housing.

25. A bearing cartridge according to claim 24, wherein the cartridge is made of plastic.

26. A bearing cartridge for use in a step bearing which in use supports an end of a spinning rotor shaft loaded with axial force, said cartridge comprising:

a rotatable ball engageable in use with the end of the spinning rotor shaft, lubricating grease, and a cartridge housing surrounding and supporting the ball and lubricating grease, wherein said cartridge housing is configured to be disassembled as a unit from a spinning unit assembly together with the ball, and wherein the cartridge can be disassembled in a direction opposite the direction of the axial force.

27. A bearing cartridge according to claim 26, wherein the cartridge comprises a collecting chamber for the lubricating grease exiting from the housing, said collecting chamber being disposed adjacent to the housing and through which collecting chamber the shaft projects into the housing.

28. A bearing cartridge according to claim 26, wherein the cartridge is made of plastic.

29. A bearing cartridge for use in a step bearing which in use supports an end of a spinning rotor shaft loaded with axial force, said cartridge comprising:
- a rotatable ball engageable in use with the end of the spinning rotor shaft,
- lubricating grease, and
- a cartridge housing surrounding and supporting the ball and lubricating grease,
- wherein said cartridge housing is configured to be disassembled as a unit from a spinning unit assembly together with the ball, and
- wherein the supporting ball is surrounded, in the peripheral direction of the shaft, by webs arranged at short distances therefrom, the said webs projecting inwards from the peripheral wall of the cartridge.

30. A bearing cartridge according to claim 29, wherein the cartridge comprises a collecting chamber for the lubricating grease exiting from the housing, said collecting chamber being disposed adjacent to the housing and through which collecting chamber the shaft projects into the housing.

31. A bearing cartridge according to claim 29, wherein the cartridge is made of plastic.

32. A bearing cartridge according to claim 29, wherein the housing is divided by the webs into sectioned parts for housing the lubricating grease, which sectioned parts are open in the direction of the supporting ball.

33. A bearing cartridge according to claim 32, wherein the cartridge is made of plastic.

34. A bearing cartridge according to claim 32, wherein the cartridge comprises a collecting chamber for the lubricating grease exiting from the housing, said collecting chamber being disposed adjacent to the housing and through which collecting chamber the shaft projects into the housing.

35. A bearing cartridge according to claim 34, wherein the cartridge is made of plastic.

* * * * *